(12) United States Patent
Auletto et al.

(10) Patent No.: US 9,779,630 B2
(45) Date of Patent: Oct. 3, 2017

(54) METHOD AND DEVICE FOR CALCULATING A CONJUGATED AIRPORT NAVIGATION GRAPH, RELATED METHOD AND SYSTEM FOR GENERATING A TAXI ROUTING OF AN AIRCRAFT, RELATED COMPUTER PROGRAM PRODUCT

(71) Applicant: Thales, Courbevoie (FR)

(72) Inventors: Rémy Auletto, Toulouse (FR); Johann Dreo, Palaiseau (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/977,172

(22) Filed: Dec. 21, 2015

(65) Prior Publication Data

US 2016/0180720 A1    Jun. 23, 2016

(30) Foreign Application Priority Data

Dec. 19, 2014 (FR) ..................................... 14 02940

(51) Int. Cl.
  *G08G 5/06* (2006.01)
  *G01C 23/00* (2006.01)
  *G01C 21/34* (2006.01)
  *G01C 21/20* (2006.01)

(52) U.S. Cl.
  CPC ............. *G08G 5/065* (2013.01); *G01C 23/00* (2013.01)

(58) Field of Classification Search
  None
  See application file for complete search history.

(56) References Cited

U.S. PATENT DOCUMENTS

| 6,266,610 B1* | 7/2001 | Schultz | G05D 1/101 701/528 |
| 7,343,229 B1* | 3/2008 | Wilson | G08G 5/0021 340/951 |
| 8,824,337 B1* | 9/2014 | Geisberger | G01C 21/3446 370/238 |
| 2013/0103297 A1* | 4/2013 | Bilek | G08G 5/065 701/120 |

(Continued)

FOREIGN PATENT DOCUMENTS

| FR | 2919416 A1 | 1/2009 |
| FR | 3004250 A1 | 10/2014 |

*Primary Examiner* — Krishnan Ramesh
(74) *Attorney, Agent, or Firm* — Thompson Coburn LLP

(57) ABSTRACT

This method for computing a conjugated airport navigation graph, from an initial airport navigation graph, is implemented by a computer.
This method involves acquiring the initial graph including a plurality of navigation arcs, each including two end nodes, having at least one authorized navigation direction and being identified by its two end nodes.
This method further involves determining a conjugated node for each navigation arc and for each authorized navigation direction of the arc, each conjugated node corresponding to a single authorized direction and representing the arc of the initial graph associated with the authorized direction. The conjugated graph is computed by connecting the conjugated nodes as a function of the connections between the arcs of the initial graph and the authorized directions. Two conjugated nodes connect to one another corresponding to two successive arcs of the initial graph and to a same authorized direction.

10 Claims, 3 Drawing Sheets

(56) References Cited

U.S. PATENT DOCUMENTS

| | | | | |
|---|---|---|---|---|
| 2014/0019033 A1* | 1/2014 | Berge | ................... | G08G 5/00 |
| | | | | 701/120 |
| 2014/0303815 A1* | 10/2014 | Lafon | ............... | G01C 21/3446 |
| | | | | 701/3 |
| 2016/0140855 A1* | 5/2016 | Gannon | ................ | G08G 5/065 |
| | | | | 701/533 |
| 2016/0343262 A1* | 11/2016 | Auletto | ............. | G01C 21/3438 |

* cited by examiner

METHOD AND DEVICE FOR CALCULATING A CONJUGATED AIRPORT NAVIGATION GRAPH, RELATED METHOD AND SYSTEM FOR GENERATING A TAXI ROUTING OF AN AIRCRAFT, RELATED COMPUTER PROGRAM PRODUCT

BACKGROUND OF THE INVENTION

The present invention relates to a method for computing a conjugated airport navigation graph, from an initial airport navigation graph corresponding to an airport navigation network. The navigation network is associated with an airport domain.

The method is implemented by a computer and comprises acquiring the initial airport navigation graph, said initial graph including a plurality of navigation arcs. Each navigation arc includes two end nodes, has at least one authorized navigation direction, and is identified by its two end nodes.

The invention also relates to a method for generating a taxi trajectory of an aircraft in the airport domain, wherein the taxi trajectory is generated from a conjugated graph computed using such a computing method.

The invention also relates to a non-transitory computer-readable medium including a computer program product including software instructions which, when implemented by a computer, carry out such a computing method and/or such a generating method.

The invention also relates to an electronic device for computing the conjugated airport navigation graph.

The invention also relates to an electronic system for generating the taxi trajectory of the aircraft in the airport domain, comprising such an electronic computing device.

The invention relates generally to the field of taxi assistance for an aircraft in an airport domain, the taxi assistance in particular being done in the form of a display, intended for the crew of the aircraft or an operator of a control tower, of the trajectory to be followed in the airport domain, in particular from the initial parking to takeoff or from landing to arrival parking. Alternatively or additionally, the taxi assistance is done by sending the generated trajectory to an onboard avionics system.

The invention relates to any aircraft able to taxi in the airport field, in particular a civilian or military airplane for transporting passengers or goods, or a drone, or even a helicopter.

Taxiing, or taxi, refers to a movement of the aircraft in the airport domain, the aircraft being in contact with the ground in the case of an airplane or a drone or near the ground in the case of a helicopter.

PRIOR ART

Known from document FR 2,919,416 A1 is a method and device for generating a connectivity graph for elements of an aircraft to assist with taxiing of an aircraft at the airport. An airport navigation network is associated with an airport domain, i.e., the airport, and this network includes a plurality of polygons, each polygon representing an element of the airport. This method generates, for any pair of polygons having a shared border, at least one node situated on that shared border, then defines, for each navigation node, a navigation arc, the navigation arc being a segment connecting two successive navigation nodes. This method next determines, for each navigation node, a heading, called navigation heading, defining the angle between the North direction and the navigation arc passing through the navigation node and oriented in the passage direction of the aircraft. Airport navigation information is then displayed for the crew, from the comparison of the actual heading of the aircraft, the navigation heading and a position of a navigation node of an element of a setpoint to be achieved.

However, such a connectivity graph is relatively difficult for the crew of the aircraft to use, and the computation, from this connectivity graph, of a possible trajectory followed by the aircraft is complex.

SUMMARY OF THE INVENTION

The aim of the invention is therefore to propose a method and device for computing a conjugated airport navigation graph, from an initial airport navigation graph corresponding to an airport navigation network, the conjugated graph next making it possible to more easily generate a taxi trajectory of the aircraft.

To that end, the invention relates to a method of the aforementioned type, wherein the method further comprises:
  determining a conjugated node for each navigation arc and for each authorized navigation direction of said arc, each conjugated node corresponding to a single authorized navigation direction and representing said arc of the initial graph associated with said authorized navigation direction; and
  computing the conjugated graph by connecting the conjugated nodes as a function of the connections between the arcs of the initial graph and the authorized navigation directions, two conjugated nodes connected to one another corresponding to two successive arcs of the initial graph and to a same authorized navigation direction.

According to other advantageous aspects of the invention, the computing method comprises one or more of the following features, considered alone or according to all technically possible combinations:
  the method further comprises the classification of the determined conjugated nodes into first and second distinct subsets, the first subset including the conjugated node(s) corresponding to navigable arcs for any clearance and the second subset including the conjugated node(s) corresponding to navigable arcs only for one or more clearances, each clearance including a sequence of elements of the airport domain that a respective aircraft must successively follow during taxiing;
  the second subset includes one or more conjugated nodes corresponding to arcs associated with runway crossings of the airport domain;
  the second subset includes one or more conjugated nodes corresponding to arcs associated with parking areas of the airport domain;
  the method comprises acquiring a minimum curve radius corresponding to the maximum steering of a considered aircraft, and
  during computing the conjugated graph, two conjugated nodes are connected to one another only when the two successive arcs of the initial graph, identified by said conjugated nodes, form a curve radius between them higher than the minimum curve radius;
  the method comprises acquiring at least one dimension relative to the bulk of a considered aircraft, and
  during determining the conjugated nodes, a conjugated node is determined for a respective arc of the initial graph only if said arc is compatible with each required dimension;

the method comprises acquiring the mass of the considered aircraft, and during determining the conjugated nodes, a conjugated node is determined for a respective arc of the initial graph only if said arc is compatible with the acquired mass; and computing the conjugated graph includes deleting a node conjugated with a single preceding conjugated node and a single following conjugated node, the preceding conjugated node and the following conjugated node then being directly connected to one another.

The invention also relates to a method for generating a taxi trajectory of an aircraft in an airport domain, the method being implemented by a computer and comprising:

acquiring a clearance including a sequence of elements of the airport domain that the aircraft must successively follow, and generating the taxi trajectory of the aircraft in the airport domain, wherein the taxi trajectory of the aircraft is generated from a conjugated airport navigation graph computed using a computing method as defined above.

The invention also relates to a non-transitory computer-readable medium including a computer program product including software instructions which, when they are implemented by a computer, implement such a computation method as defined above and/or such a generating method as defined above.

The invention also relates to an electronic device for computing a conjugated airport navigation graph, from an initial airport navigation graph corresponding to an airport navigation network, the navigation network being associated with an airport domain, the electronic device comprising:

a module for acquiring the initial airport navigation graph, said initial graph including a plurality of navigation arcs, each navigation arc including two end nodes, having at least one authorized navigation direction and being identified by its two end nodes, a module for determining a conjugated node for each navigation arc and for each authorized navigation direction of said arc, each conjugated node corresponding to a single authorized navigation direction and representing said arc of the initial graph associated with said authorized navigation direction; and a module for computing the conjugated graph, the computing module being configured to connect the conjugated nodes as a function of the links between the arcs of the initial graph and the authorized navigation directions, two conjugated nodes connected to one another corresponding to two successive arcs of the initial graph and to a same authorized navigation direction.

The invention also relates to an electronic system for generating a taxi trajectory of an aircraft in an airport domain, the system comprising:

a device for acquiring a clearance, the clearance including a series of elements of the airport domain that the aircraft must successively follow, and a device for generating the taxi trajectory of the aircraft in the airport domain, as a function of the acquired clearance, wherein the system further comprises an electronic device for computing a conjugated airport navigation graph, the computing device being as defined above, and the generating device is configured to generate the taxi trajectory of the aircraft from the conjugated graph computed by said computing device.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF PREFERRED EMBODIMENTS

Figure 1:
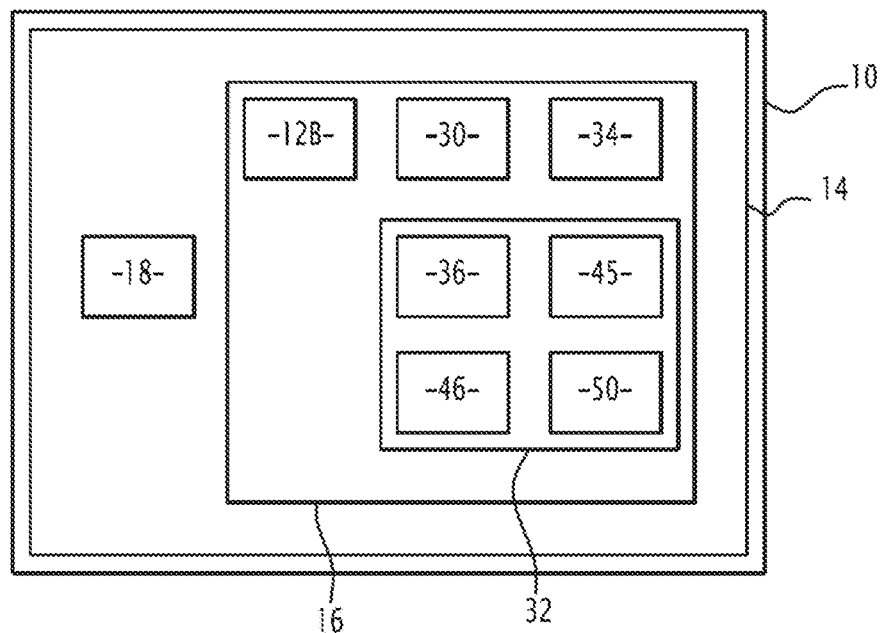
FIG. 1 is a diagrammatic illustration of an electronic system according to the invention for generating a taxi trajectory of an aircraft in an airport domain.

FIG. 1 shows an electronic system 10 for generating a taxi trajectory of an aircraft, not shown, in an airport domain 12A, the airport domain 12A being associated with an airport navigation network 12B. The generating system 10 comprises an information processing unit 14, for example formed from a memory 16 and a processor 18 associated with the memory 16. The taxi trajectory is also called taxi routing, or also taxi route. The taxi trajectory is the trajectory to be followed by the aircraft when taxiing, i.e. when moving in the airport domain.

Figure 2:
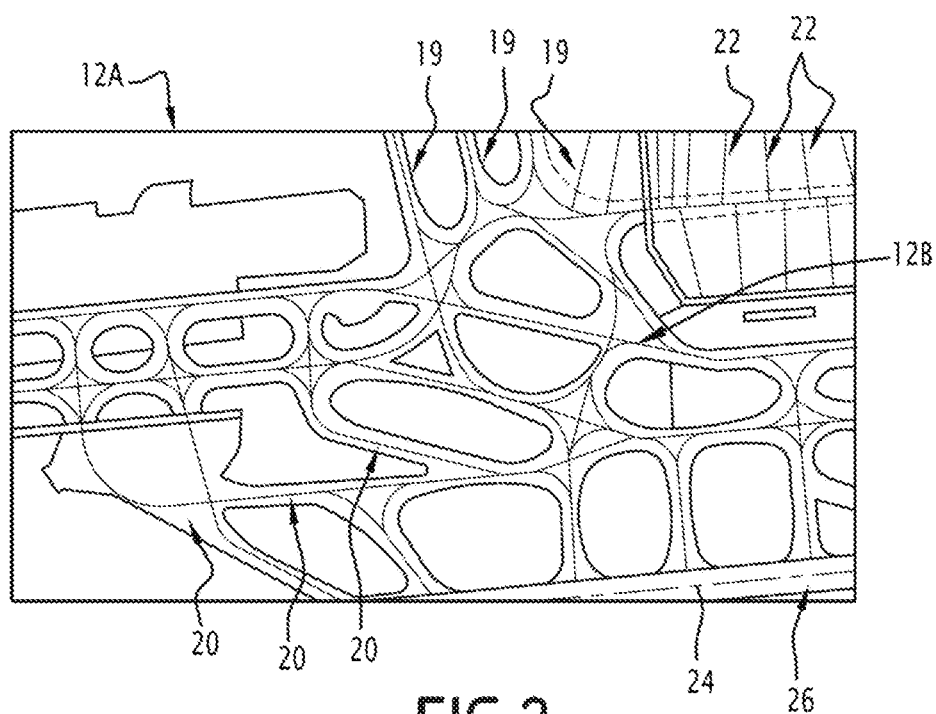
FIG. 2 is a partial diagrammatic illustration of the airport domain and the airport navigation network associated with that domain.

The airport domain 12A, visible in FIG. 2, includes different airport elements 19, in particular taxiways 20, parking areas 22, one or more runways 24 and one or more runway crossings 26.

The navigation network 12B is in accordance with standards EUROCAE ED99C and EUROCAE ED119B or the subsequent versions of these standards. The navigation network 12B forms a model of the entire airport domain 12A.

The memory 16 is able to store the airport navigation network 12B.

The memory 16 is also able to store software 30 for acquiring a clearance, software 32 for computing a conjugated airport navigation graph 33 and software 34 for generating a taxi trajectory of the aircraft in the airport domain 12A from the acquired clearance and the conjugated graph 33 computed by the computing software 32.

The processor 18 is able to execute each of the acquisition 30, computing 32 and taxi generation 34 programs. When the acquisition 30, computing 32 and taxi generation 34 programs are executed by the processor 18, they form an electronic clearance acquisition device, an electronic computing device for the conjugated graph and an electronic device for generating the taxi trajectory of the aircraft, respectively.

Alternatively, the acquisition device 30, the computing device 32 and the generating device 34 are made in the form of programmable logic components, or in the form of dedicated integrated circuits.

The acquisition device 30 is configured to acquire the clearance, the latter having previously been entered by a member of the aircraft crew using entry means, not shown, or received in the form of a data file from another piece of avionics equipment, not shown.

The acquired clearance comprises a sequenced series of elements 19 of the airport domain that the aircraft must successively follow. The acquired clearance in particular comprises a starting point, which by default corresponds to the current position of the aircraft, and an arrival point. As an optional addition, the acquired clearance comprises a sequenced list of intermediate taxiways between the departure point and the arrival point.

Figure 3:
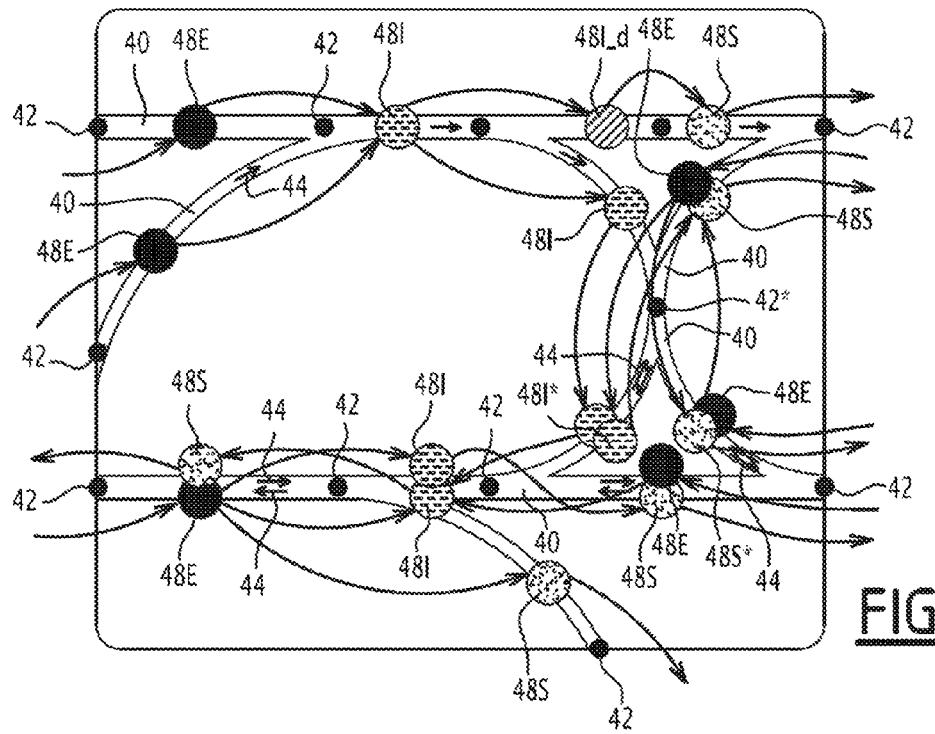
FIG. 3 is a diagrammatic illustration of an initial airport navigation graph corresponding to the airport navigation network, as well as conjugated nodes determined from this initial graph.

The electronic device 32 for computing the conjugated graph comprises a first module 36 for acquiring an initial airport navigation graph 38. As shown in FIG. 3, the initial graph 38 includes a plurality of navigation arcs 40, each navigation arc 40 including two end nodes 42. Each navigation arc 40 has at least one authorized navigation direction, each authorized navigation direction being shown by a respective arrow 44 in FIG. 3. Each navigation arc 40 is identified by its two end nodes 42.

The computing device 32 comprises a second module 45 for acquiring information relative to the aircraft, such as a minimum curve radius corresponding to the maximum steering of the aircraft, at least one dimension relative to the bulk, such as the wingspan and/or the height of the aircraft, and/or the mass of the aircraft.

The computing device 32 further comprises a module 46 for determining a conjugated node 48E, 48I, 48S, for each navigation arc 40 and for each authorized navigation direction 44 of said arc. Each conjugated node 48E, 48I, 48S corresponds to a single airport element and to a single authorized navigation direction 44. Each conjugated node 48E, 48I, 48S then represents said arc 40 of the initial graph associated with said authorized navigation direction 44.

The computing device 32 further comprises a module 50 for computing the conjugated graph 33, the computing module 50 being configured to connect the conjugated nodes 48E, 48I, 48S as a function of the links between the arcs 40 of the initial graph 38 and the authorized navigation directions 44, two conjugated nodes 48E, 48I, 48S connected to one another corresponding to two successive arcs 40 of the initial graph and a same authorized navigation direction 44.

The taxi trajectory generating device 34 is configured to generate the taxi trajectory of the aircraft as a function of the acquired clearance and from the conjugated graph 33 computed by the computing device 32.

In the example of FIG. 1, the first acquisition module 36, the second acquisition module 45, the determining module 46 and the computing module 50 are each made in the form of a software function included in the computing software 32 and able to be executed by the processor 18.

Alternatively, the first acquisition module 36, the second acquisition module 45, the determining module 46 and the computing module 50 are made in the form of programmable logic components, or in the form of dedicated integrated circuits.

The initial airport navigation graph 38 is also called airport connectivity graph, or ASRN (Aerodrome Surface Routing Network) graph. In other words, this initial graph 38 shows all of the paths that can be followed by the aircraft in the airport. The arcs 40 and the end nodes 42 are labeled so as to be able to be attached to the airport elements used in the clearances.

The initial graph 38 is for example according to standard ARINC 816-2 or the subsequent versions of this standard.

The determining module 46 is configured to determine, for each navigation arc 40 and for each authorized navigation direction 44 of said arc, the corresponding conjugated node 48E, 48I, 48S.

Figure 5:
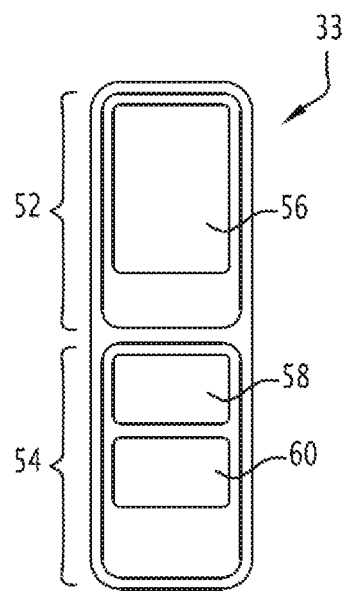
FIG. 5 is a diagrammatic illustration of the classification of the conjugated nodes into first and second separate subsets, the first subset including the conjugated nodes corresponding to arcs navigable for any clearance and the second subset including the conjugated nodes corresponding to arcs navigable only for certain clearances.

As an optional addition, the determining module 46 is configured to classify the conjugated nodes 48E, 48I, 48S into first 52 and second 54 separate subsets, as shown in FIG. 5. The first subset 52 includes the conjugated node(s) 48E, 48I, 48S corresponding to navigable arcs for any clearance. In other words, the first subset 52 includes the conjugated node(s) 48E, 48I, 48S corresponding to navigable arcs irrespective of the clearance acquired by the acquisition device 30. The second subset 54 includes the conjugated node(s) 48E, 48I, 48S corresponding to navigable arcs only for one or more clearances. In other words, the second subset 54 includes the conjugated node(s) 48E, 48I, 48S corresponding to arcs whose use is subject to the clearance, i.e., the use of which depends on the clearance.

As an optional addition, the determining module 46 is configured to determine the conjugated node related to a respective arc 40 of the initial graph 38 only if said arc is compatible with each dimension of the aircraft acquired for the second acquisition module 45, such as the wingspan or the height.

As an optional addition, the determining module 46 is configured to determine the conjugated node related to a respective arc 40 of the initial graph 38 only if said arc is compatible with the mass of the aircraft acquired by the second acquisition module 45.

As an optional addition, the determining module 46 is configured to associate each conjugated node 48E, 48I, 48S with the curvilinear length of the corresponding arc 40 of the initial graph.

Figure 4:
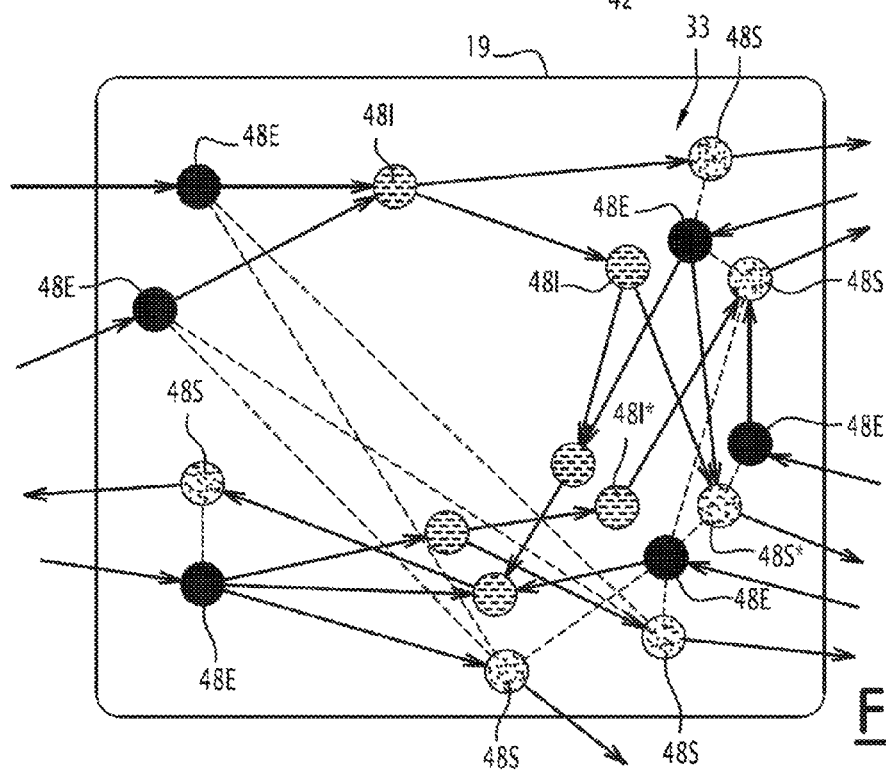
FIG. 4 is a diagrammatic illustration of a conjugated graph computed from the initial graph of FIG. 3.

By convention, the conjugated node is denoted 48E when it corresponds to an entry arc in a given airport element 19, the conjugated node is denoted 48S when it corresponds to an exit arc of said airport element 19, and the conjugated node is denoted 48I when it corresponds to an intermediate arc of said airport element 19, as shown in FIGS. 3 and 4.

The module for computing the conjugated graph 50 is configured to compute the conjugated graph 33 by connecting the conjugated nodes as a function of the links between the arcs of the initial graph and the authorized navigation directions, two conjugated nodes connected to one another corresponding to two successive arcs of the initial graph and to a same authorized navigation direction.

As an optional addition, the computing module 50 is configured to connect two conjugated nodes 48E, 48I, 48S to one another only when the two successive arcs 40 of the initial graph, identified by said conjugated nodes 48E, 48I, 48S, form a curve radius between them greater than the minimum curve radius of the aircraft acquired by the second acquisition module 45.

As an illustrative example of this optional addition, the conjugated nodes identified by notations 48I* and 48S* are then not connected to one another in the conjugated graph 33 shown in FIG. 4, whereas they correspond to successive arcs, sharing the end node denoted 42*, and have the same authorized navigation direction. The curve radius between the navigation arcs 40 associated with the conjugated nodes 48I* and 48S* is in fact smaller than the minimum curve radius. In other words, the angle between these navigation arcs 40 associated with the conjugated nodes 48I\*, 48S\* is too small to be reachable with the minimum steering angle of the aircraft.

As an optional addition, the computing module 50 is configured to eliminate a conjugated node having a single preceding conjugated node and a single following conjugated node, the preceding conjugated node and the following conjugated node then being directly connected to one another. The eliminated conjugated node does not contribute any additional functional information relative to information already provided by said preceding and following conjugated nodes.

As an illustrative example of this optional addition, the conjugated node identified by notation 48I_d, shown in FIG. 3, is then eliminated, and does not appear in the conjugated graph 33, shown in FIG. 4, in which the preceding conjugated node 48I and the following conjugated node 48S of this eliminated conjugated node 48I_d are directly connected to one another.

As another optional addition, the computing module 50 is configured to eliminate a conjugated node corresponding to an arc at an impasse if said arc at an impasse does not correspond to an element of the clearance, and in particular not to the departure point or the arrival point of the clearance. A conjugated node corresponding to an arc at an impasse is a conjugated node having only one or several preceding conjugated nodes or having only one or several following conjugated nodes, in the authorized navigation direction 44 associated with said conjugated node. In other words, according to this optional addition, the computing module 50 is configured to eliminate a conjugated node not having a preceding conjugated node or not having a following conjugated node, in the authorized navigation direction 44 associated with said conjugated node, and if said conjugated node does not correspond to an element of the clearance.

The first subset 52 for example includes conjugated nodes corresponding to arcs associated with taxiways, included in a first zone 56 of FIG. 5.

The second subset 54 for example includes conjugated nodes corresponding to arcs associated with runway crossings of the airport domain 12A, included in a second zone 58 in FIG. 5. The second subset 54 for example includes conjugated nodes corresponding to arcs associated with parking areas of the airport domain 12A, included in a third zone 60 in FIG. 5.

Figure 6:
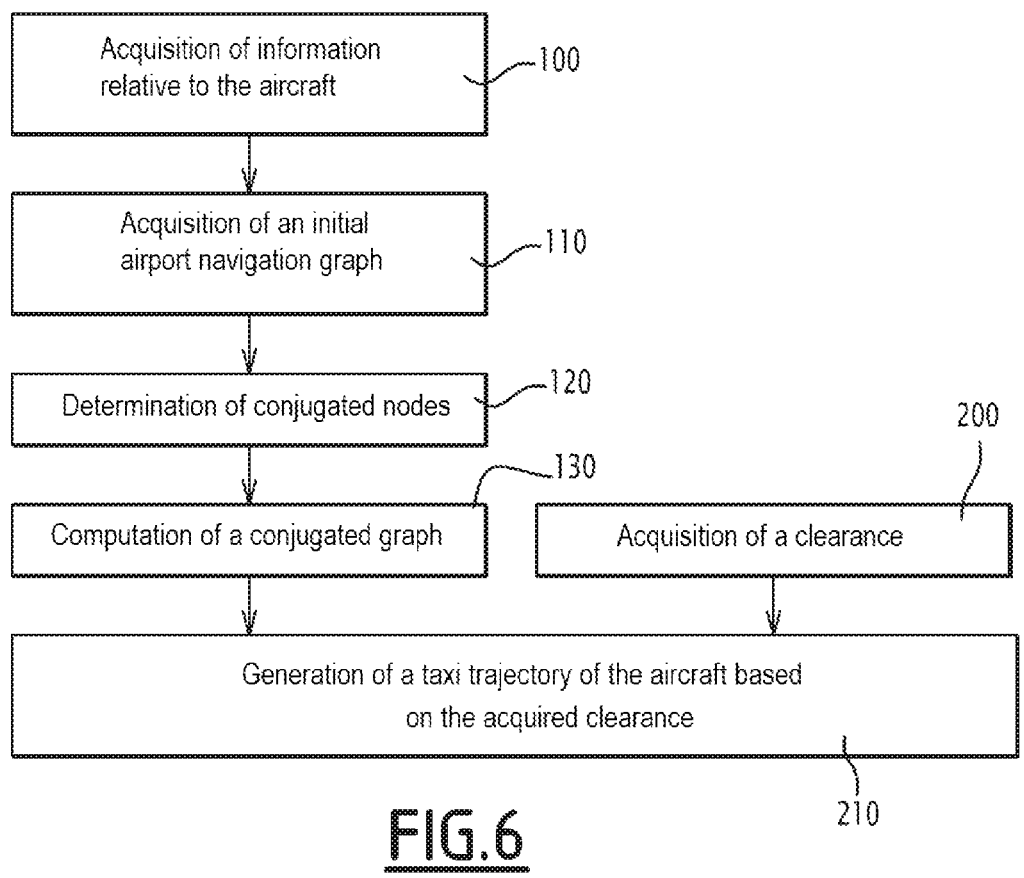
FIG. 6 is a flowchart of a method according to the invention for generating the taxi trajectory of the aircraft, including the steps of a method for computing the conjugated graph.

The operation of the taxi trajectory generating system 10 and the electronic conjugated graph computing device 32 according to the invention will now be explained using FIG. 6, showing a flowchart of the method according to the invention for generating the taxi trajectory of the aircraft, including the steps of the method according to the invention for computing the conjugated graph.

During an optional initial step 100, the second acquisition module 45 acquires information relative to the aircraft. If information relative to the aircraft is acquired, that information for example includes the minimum curve radius corresponding to the maximum steering of the aircraft, also called minimum steering radius of the aircraft, at least one dimension relative to the bulk of the aircraft, such as its wingspan and/or its height, and/or the mass of the aircraft.

During step 110, the first acquisition module 36 next acquires the initial airport navigation graph 38, for example from an airport database. The acquired initial graph 38 includes all of the navigation arcs 40 associated with the airport navigation network 12B, each navigation arc 40 for example being in the form of a series of points, i.e., the end nodes 42 and intermediate points comprised between these end nodes 42. Each navigation arc 40 has one or two authorized navigation directions depending on whether the considered arc 40 is mono-directional or bidirectional, and is identified by its two end nodes 42. A value of said arc 40 according to a predetermined cost function is further associated with the pair of end nodes 42 representing each arc 40.

The cost function associated with the arc 40 is for example the curvilinear length of the arc. Alternatively, the cost function associated with the arc 40 is the quantity of fuel consumed when the aircraft travels said arc. Also alternatively, the cost function associated with the arc 40 is a function representative of the congestion of the paths associated with said arc. Also alternatively, the cost function associated with the arc 40 is a function representative of an accident risk on said arc.

During the following step 120, the determining module 46 determines the conjugated node 48E, 48I, 48S for each navigation arc 40 and for each authorized direction 44 associated with said arc. Each conjugated node 48E, 48I, 48S then corresponds to a single authorized navigation direction 44, and represents said arc 40 of the initial graph associated with said authorized direction 44.

As an optional addition, during the determining step 120, the determined conjugated nodes are classified into first 52 and second 54 separate subsets. The first subset 52, also called permanent sub-graph, includes the conjugated nodes 48E, 48I, 48S corresponding to arcs 40 navigable for any clearance. It primarily includes the set of taxiways 20 of the airport. The second subset 54, also called optional sub-graph, forms the complement of the permanent sub-graph, and includes the conjugated nodes 48E, 48I, 48S corresponding to arcs 40 whose use depends on the clearance.

In other words, this optional addition consists of a pretreatment of particular zones of the airport, in particular the runway crossings and the parking areas. A runway can only be crossed if it is explicitly requested in the acquired clearance. In order to facilitate the management of this constraint, the portions of the initial graph 38 corresponding to a runway crossing are, in the conjugated graph 33, isolated and identified with the name of the crossed runway. Ground travel within the airport is done via the taxiways 20, the parking areas only being usable for the beginning and/or end of journeys. In other words, it is prohibited to "cut" through the parking areas. In order to facilitate the management of this constraint, the portions of the initial graph 38 corresponding to the parking zones are, in the conjugated graph 33, isolated from the rest of the conjugated graph 33, as shown in FIG. 5.

This structuring in two subsets 52, 54 makes it possible, upon receiving clearance, and prior to computing the taxi trajectory, to filter, within the optional subgraph 54, the elements that are not authorized as a function of the acquired clearance. The structuring then makes it possible to prohibit crossings of runways and parking areas not authorized by the clearance, and to limit the size of the conjugated graph 33 to be explored in order to generate the taxi trajectory, which decreases the overall processing time and the quantity of memory used accordingly.

As an optional addition, during the determining step 120, the conjugated nodes 48E, 48I, 48S are determined for only the arcs 40 of the initial graph 38 that are compatible with the dimension (wingspan, height) of the aircraft and/or with the acquired mass of the aircraft. The arcs 40 compatible with the dimension of the aircraft are the arcs 40 that have no size limitation or the arcs whose size limitation exceeds the size of the aircraft. Similarly, the arcs 40 that are compatible with the mass of the aircraft are the arcs 40 that have no mass limitation or the arcs whose mass limitation exceeds the mass of the aircraft.

This restriction of the conjugated nodes 48E, 48I, 48S to only the arcs 40 compatible with the size (wingspan, height) of the aircraft and/or with the mass of the aircraft is done via prior filtering, and the incompatible conjugated nodes are not determined. Alternatively, all of the conjugated nodes 48E, 48I, 48S are first determined; then the conjugated nodes that are incompatible with the size of the aircraft and/or with the mass of the aircraft are secondly eliminated.

The computing module 50 next computes, during the following step 130, the conjugated graph 33 by connecting the conjugated nodes 48E, 48I, 48S as a function of the connections between the arcs 40 of the initial graph 38 and as a function of the authorized navigation directions 44, two conjugated nodes 48E, 48I, 48S connected to one another corresponding to two successive arcs 40 of the initial graph 38 and to a same authorized direction 44.

One skilled in the art will then understand that a unique pathway of the initial graph 38 is associated with any pathway of the conjugated graph 33. In other words, all of the pathways defined by the conjugated graph 33 are injected in all of the pathways of the initial graph 38.

As an optional addition, during the computing step 130, two conjugated nodes 48E, 48I, 48S are connected to one another only when two successive arcs 40 of the initial graph 38, identified by said conjugated nodes 48E, 48I, 48S, form a curve radius between them higher than the minimum curve radius. This then makes it possible to eliminate the linking of navigation arcs that are incompatible with the minimum steering radius of the aircraft. Alternatively, all of the conjugated nodes 48E, 48I, 48S are connected to one another as a function only of the authorized direction first; then the transitions between conjugated nodes that are incompatible with the minimum steering radius of the aircraft are secondly eliminated.

As another optional addition, during the computing step 130, the computing module 50 eliminates each conjugated node 48I_d with a single preceding conjugated node and a single following conjugated node, the preceding conjugated node and the following conjugated node of said eliminated conjugated node 48I_d then being directly connected to one another. This makes it possible to simplify the conjugated graph 33, such a conjugated node 48I_d with a single preceding conjugated node and a single following conjugated node being useless to generate the taxi trajectory.

Thus, the conversion of the initial graph 38 into the conjugated graph 33 makes it possible to facilitate the integration of constraints related to the clearance and/or the aircraft. To further facilitate the processing of traffic constraints, the conjugated graph 33 is further structured between the permanent sub-graph 54 not including a conjugated node associated with a runway crossing or a parking area crossing, and the optional sub-graph 56 on the one hand including the conjugated nodes associated with the runway crossings 26, and on the other hand the conjugated nodes associated with the parking area crossings.

The constraints that may be taken into account in the conjugated graph 33 and that are not already present in the initial graph 33 are in particular: the size (wingspan, height) of the considered aircraft, the weight (or mass) of the considered aircraft, the minimum steering radius of the considered aircraft, taxiways under construction, doors reserved for certain types of aircraft.

The conjugated graph then makes it possible, from taking these constraints into account, to prevent a taxi trajectory not respecting one of these constraints from next being generated and used by the pilot even though it is erroneous.

One skilled in the art will further note that steps 100 to 130 making up the method for computing the conjugated graph 33 are, with the exception of the appropriateness for clearance, able to be done in preprocessing, in particular prior to step 200 for acquiring the clearance, which will be described below. This makes it possible to advance the associated computing time to less critical moments, or even to perform the computations on the ground before starting the aircraft engines.

One skilled in the art will also understand that the computing method is implemented each time there is a change in the airport navigation network 12B.

Also alternatively, the method for computing the conjugated graph 33 is carried out on the ground and the conjugated graph is stored directly in a database to next be taken onboard in the memory 16 of the electronic taxi trajectory generating system 10. This makes it possible to simplify and lighten the processing operations done in the electronic generating system 10.

During an initial step 200, the method for generating the taxi trajectory of the aircraft comprises acquiring the clearance using the acquisition device 30. The acquired clearance includes a sequenced series of airport elements 19 that the aircraft will successively follow.

During the following step 210, the generating device 34 generates the trajectory of the aircraft on the ground in the airport domain 12A as a function of the acquired clearance. The taxi trajectory of the aircraft is then generated from the conjugated graph 33 previously computed during steps 110 to 130 using the computing device 32.

As previously indicated, generating the taxi trajectory of the aircraft from the conjugated graph 33 then makes it possible to facilitate its computation, and additionally to take all or some of the following constraints into account: the size (wingspan, height) of the considered aircraft, the weight (or mass) of the considered aircraft, the minimum steering radius of the considered aircraft, taxiways under construction, doors reserved for certain types of aircraft.

The taxi trajectory is next displayed on a display screen (not shown) of the aircraft, in order to provide the crew with assistance in taxiing of the aircraft in the airport domain 12A.

Additionally, the computation of the conjugated graph 33 and the generation of the taxi trajectory from the acquired clearance makes it possible to extend the avionics management of the aircraft to the ground zones, so as to improve the fluidity of traffic in the airport domain 12A.

Also additionally, the computation of the conjugated graph 33 and the generation of the taxi trajectory from the acquired clearance makes it possible to set up alert systems to decrease risks of ground accidents (runway incursion, attachment, etc.).

One can thus see that the method and device 32 for computing a conjugated airport navigation graph 33, from the initial airport navigation graph 38 corresponding to the airport navigation network 12B, allows easier management of the taxi trajectory of the aircraft, and more generally, makes it possible to provide the crew with better assistance in taxiing of the aircraft in the airport domain 12A.

The invention claimed is:

1. A method for generating a taxi trajectory of an aircraft in an airport domain, the method being implemented by a computer and comprising:

acquiring a clearance including a sequence of elements of the airport domain that the aircraft must successively follow, and generating the taxi trajectory of the aircraft in the airport domain as a function of the acquired clearance, wherein the taxi trajectory of the aircraft is generated from a conjugated airport navigation graph from an initial airport navigation graph corresponding to an airport navigation network by, (1) acquiring the initial airport navigation graph, said initial graph including a plurality of navigation arcs, each navigation arc including two end nodes, having at least one authorized navigation direction and being identified by its two end nodes, (2) determining a conjugated node for each navigation arc and for each authorized navigation direction of said arc, each conjugated node corresponding to a single authorized navigation direction and representing said arc of the initial graph associated with said authorized navigation direction, and (3) computing the conjugated graph, the conjugated graph including conjugated nodes which are connected depending on the connections between the arcs of the initial graph and the authorized navigation directions, two conjugated nodes being connected to one another when they correspond to two successive arcs of the initial graph and to a same authorized navigation direction.

2. The method according to claim 1, wherein the method further comprises the classification of the determined conjugated nodes into first and second distinct subsets, the first subset including the conjugated node(s) corresponding to navigable arcs for any clearance and the second subset including the conjugated node(s) corresponding to navigable arcs only for one or more clearances, each clearance including a sequence of elements of the airport domain that a respective aircraft must successively follow during taxiing.

3. The method according to claim 2, wherein the second subset includes one or more conjugated nodes corresponding to arcs associated with runway crossings of the airport domain.

4. The method according to claim 2, wherein the second subset includes one or more conjugated nodes corresponding to arcs associated with parking areas of the airport domain.

5. The method according to claim 1, wherein the method comprises acquiring a minimum curve radius corresponding to the maximum steering of a considered aircraft, and during computing the conjugated graph, two conjugated nodes are connected to one another only when two successive arcs of the initial graph, identified by said conjugated nodes, form a curve radius between them higher than the minimum curve radius.

6. The method according to claim 1, wherein the method comprises acquiring at least one dimension relative to the bulk of a considered aircraft, and during determining the conjugated nodes, a conjugated node is determined for a respective arc of the initial graph only if said arc is compatible with each required dimension.

7. The method according to claim 1, wherein the method comprises acquiring the mass of the considered aircraft, and during determining the conjugated nodes, a conjugated node is determined for a respective arc of the initial graph only if said arc is compatible with the acquired mass.

8. The method according to claim 1, wherein computing the conjugated graph includes deleting a node conjugated with a single preceding conjugated node and a single following conjugated node, the preceding conjugated node and the following conjugated node then being directly connected to one another.

9. A non-transitory computer-readable medium including a computer program product including software instructions which, when implemented by a computer, implement a method according to claim 1.

10. An electronic system for generating a taxi trajectory of an aircraft in an airport domain, the system comprising:

a device for acquiring a clearance, the clearance including a series of elements of the airport domain that the aircraft must successively follow;

a device for generating the taxi trajectory of the aircraft in the airport domain as a function of the acquired clearance, the generating device being configured to generate the taxi trajectory of the aircraft from a conjugated airport navigation graph; and an electronic device for computing the conjugated airport navigation graph from an initial airport navigation graph corresponding to an airport navigation network, the airport navigation network being associated with the airport domain, the electronic device further comprising:

a module for acquiring the initial airport navigation graph, said initial graph including a plurality of navigation arcs, each navigation arc including two end nodes, having at least one authorized navigation direction and being identified by its two end nodes;

a module for determining a conjugated node for each navigation arc and for each authorized navigation direction of said arc, each conjugated node corresponding to a single authorized navigation direction and representing said arc of the initial graph associated with said authorized navigation direction; and a module for computing the conjugated graph, the computing module being configured to create the conjugated graph by including conjugated nodes which are connected depending on the connections between the arcs of the initial graph and the authorized navigation directions, two conjugated nodes being connected to one another when they correspond to two successive arcs of the initial graph and to a same authorized navigation direction.

* * * * *